United States Patent
Dudzinsky (10) Patent No.: US 9,623,497 B2
(45) Date of Patent: Apr. 18, 2017

(54) ROTARY CUTTING TOOL WITH HIGH-PRESSURE COOLANT CAP

(71) Applicant: Kennametal Inc., Latrobe, PA (US)

(72) Inventor: Ronald Louis Dudzinsky, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 168 days.

(21) Appl. No.: 14/483,408

(22) Filed: Sep. 11, 2014

(65) Prior Publication Data

US 2016/0074948 A1     Mar. 17, 2016

(51) Int. Cl.
*B23C 5/28*     (2006.01)
*B23C 5/00*     (2006.01)
*B23Q 11/10*    (2006.01)

(52) U.S. Cl.
CPC .............. *B23C 5/28* (2013.01); *B23C 5/006* (2013.01); *B23C 2250/12* (2013.01); *B23C 2260/72* (2013.01); *B23Q 11/1023* (2013.01)

(58) Field of Classification Search
CPC . B23C 5/28; B23C 2240/245; B23C 2250/12; B23Q 11/1023
See application file for complete search history.

(56) References Cited

U.S. PATENT DOCUMENTS

| | | | | |
|---|---|---|---|---|
| 4,168,925 A | * | 9/1979 | Dufresne | B23B 29/02 175/213 |
| 4,320,999 A | * | 3/1982 | Briese | B23Q 11/1007 407/11 |
| 4,322,189 A | * | 3/1982 | Briese | B23Q 1/0036 407/11 |
| 5,542,792 A | | 8/1996 | Krueger et al. | |
| 7,073,988 B2 | * | 7/2006 | Giessler | B23G 5/005 408/222 |
| 8,171,608 B2 | * | 5/2012 | Kammermeier | B23C 5/06 29/50 |
| 2002/0009339 A1 | * | 1/2002 | Arvidsson | B23C 5/006 407/35 |
| 2002/0106251 A1 | | 8/2002 | Ripley | |

(Continued)

FOREIGN PATENT DOCUMENTS

| | | | | |
|---|---|---|---|---|
| CN | 201140293 Y | | 10/2008 | |
| CN | 102513563 A | * | 6/2012 | B23B 27/10 |

(Continued)

OTHER PUBLICATIONS

Apr. 11, 2006—German_First_Office_Action-DE1020151152835_and_English_Translation-K05873-DE-NP.

*Primary Examiner* — Sunil K Singh
*Assistant Examiner* — Ryan Rufo
(74) *Attorney, Agent, or Firm* — Ian K. Samways (57) ABSTRACT

A rotary cutting tool includes a cutter body, a coolant cap, and a retaining ring for removably securing the coolant cap to the cutter body. The coolant cap includes an outer surface, an inner surface and a generally cylindrical outer surface extending between the outer surface and the inner surface. The retaining ring is disposed within a retaining ring notch of the cutter body such that the outer surface of the coolant cap contacts the retaining ring when high pressure coolant is introduced into the cutter body to removably secure the coolant cap to the cutter body.

18 Claims, 6 Drawing Sheets

(56) References Cited

U.S. PATENT DOCUMENTS

| | | |
|---|---|---|
| 2006/0029481 A1* | 2/2006 | Craig .................... B23C 5/28 409/136 |
| 2007/0104549 A1 | 5/2007 | Hecht et al. |
| 2007/0127992 A1* | 6/2007 | Spichtinger ............ B23C 5/006 407/39 |
| 2008/0175676 A1 | 7/2008 | Prichard et al. |
| 2008/0175677 A1 | 7/2008 | Prichard et al. |
| 2009/0226268 A1* | 9/2009 | Pilkington ................ B23C 5/28 407/113 |
| 2011/0217131 A1* | 9/2011 | Bonnarang ............... B23C 5/28 407/11 |
| 2012/0230781 A1* | 9/2012 | Hoffer .................... B23C 5/28 407/11 |
| 2012/0275876 A1* | 11/2012 | Lehto .................... B23C 5/26 409/137 |
| 2015/0078851 A1* | 3/2015 | Liepelt ................... B23F 5/163 409/38 |
| 2016/0023288 A1* | 1/2016 | Morrison ................. B23C 5/28 407/11 |

FOREIGN PATENT DOCUMENTS

| | | | |
|---|---|---|---|
| DE | 4218879 A1 | 12/1993 | |
| DE | 19725100 A1 | 12/1998 | |
| EP | 2517815 A1 | 10/2012 | |
| JP | 2004276136 A * | 10/2004 | ............ B23C 5/28 |
| KR | 100576319 B | 5/2006 | |
| KR | 100634609 B | 10/2006 | |
| WO | 92/06817 | 4/1992 | |
| WO | 2010/020234 A1 | 2/2010 | |
| WO | WO 2010/128930 A1 * | 11/2010 | ............ B23C 5/28 |

* cited by examiner

ROTARY CUTTING TOOL WITH HIGH-PRESSURE COOLANT CAP

BACKGROUND OF THE INVENTION

Field of the Invention

The invention pertains to the field of rotary cutting tools. More particularly, the invention pertains to a rotary cutting tool with a high-pressure coolant cap for delivering high-pressure coolant flow in the vicinity of the cutting inserts mounted on the cutter body.

Description of Related Art

Milling cutters for milling operations are well known. Such milling cutters typically comprise a cutter body, which is a generally circular shaped ring having a plurality of pockets in an outer periphery thereof. A cutting insert is secured in each pocket. Each cutting insert comprises a body and at least one cutting edge. The body is secured directly in the pocket or to a cartridge, which is secured in the pocket.

In the past, it has been common to carry cutting fluid to the vicinity of the cutting inserts of the cutting tool through conduits drilled in the body of the cutting tool. A coolant cap is typically mounted to the cutter body using a plurality of threaded fasteners, such as bolts, and the like, threaded into the cutter body. Unfortunately, it has been found that the threaded fasteners can fail when high-pressure coolant flow is provided to the cutting tool, thereby causing the coolant to leak between the coolant cap and the cutter body.

Accordingly, there is a need in the art for an improved cutting tool that is capable of delivering high-pressure coolant flow in the vicinity of the cutting inserts.

SUMMARY OF THE INVENTION

The problem of delivering high-pressure coolant flow to the vicinity of cutting inserts mounted on the cutter body is solved by providing a coolant cap with a retaining ring for mounting the coolant cap to the cutter body.

In one aspect of the invention, a cutting tool comprises a cutter body having a recessed surface formed in a front face of the cutter body. The recessed surface includes a retaining ring notch formed therein. A coolant cap is disposed within the recessed surface of the cutter body. The coolant cap includes an outer surface, an inner surface and a cylindrical outer surface extending between the outer surface and the inner surface. A retaining ring is disposed within the retaining ring notch of the cutter body such that the outer surface of the coolant cap contacts the retaining ring when high pressure coolant is introduced into the cutter body to removably secure the coolant cap to the cutter body.

In another aspect of the invention, a coolant cap for a cutting tool comprises an outer surface, an inner surface and a cylindrical outer surface extending between the outer surface and the inner surface. The outer surface of the coolant cap contacts a retaining ring when high pressure coolant is introduced into the cutter body to removably secure the coolant cap to the cutter body.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring now to FIGS. 1-4, wherein like numerals designate like components throughout all of the several figures, there is illustrated a rotary cutting tool 10 according to a preferred embodiment of the invention. In the illustrated embodiment, the rotary cutting tool 10 comprises a milling cutter. In general, the milling cutter 10 comprises a cutter body 12, a coolant cap 14 provided at the center of the cutter body 12 for directing a flow of high-pressure coolant in an efficient manner from the cutter body 12, and a retaining ring 20 for releasably securing the coolant cap 14 to the cutter body 12.

Figure 1:
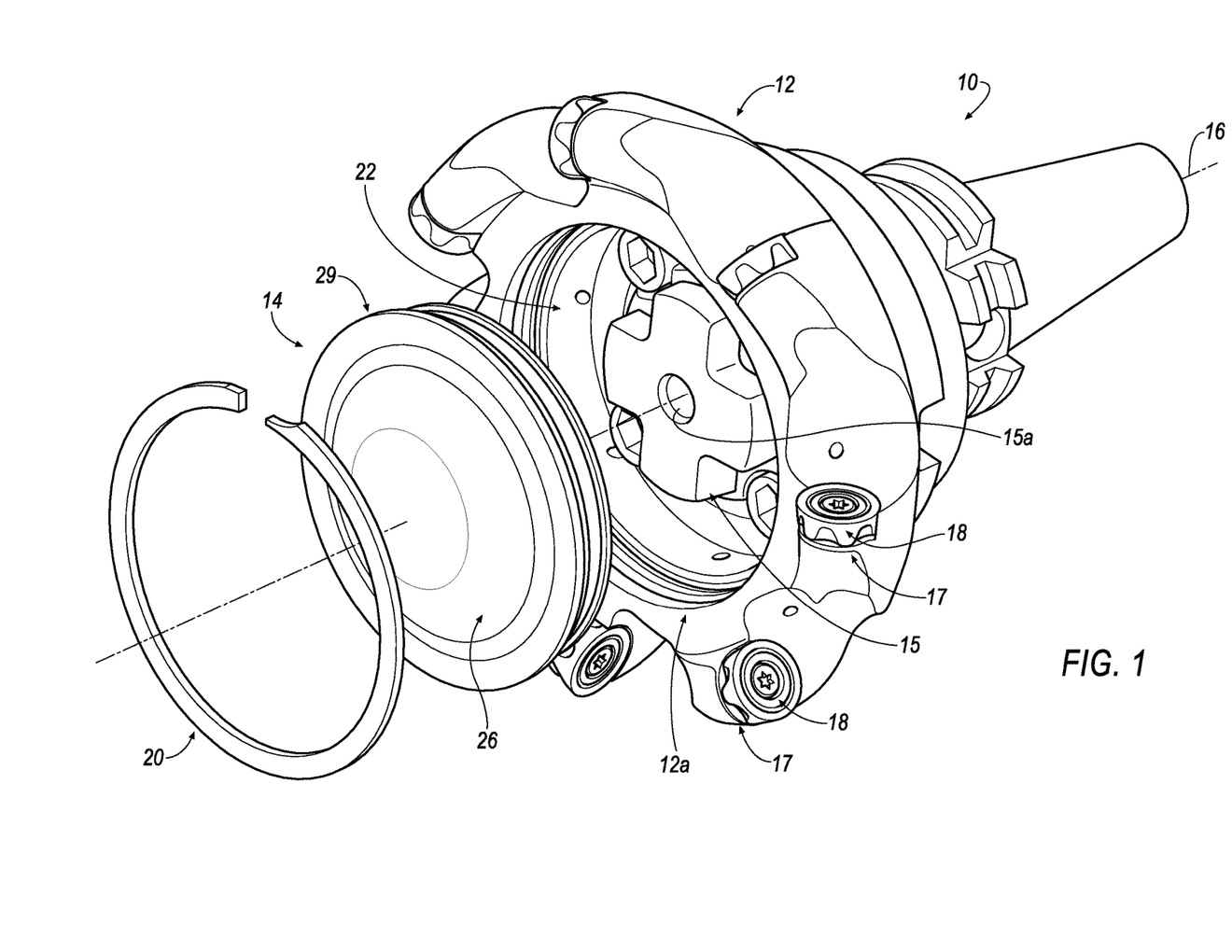
FIG. 1 is an exploded, isometric view of a cutting tool with a cutter body, a coolant cap and a retaining ring for releasably securing the coolant cap to the cutter body according to an embodiment of the invention.
Figure 2:
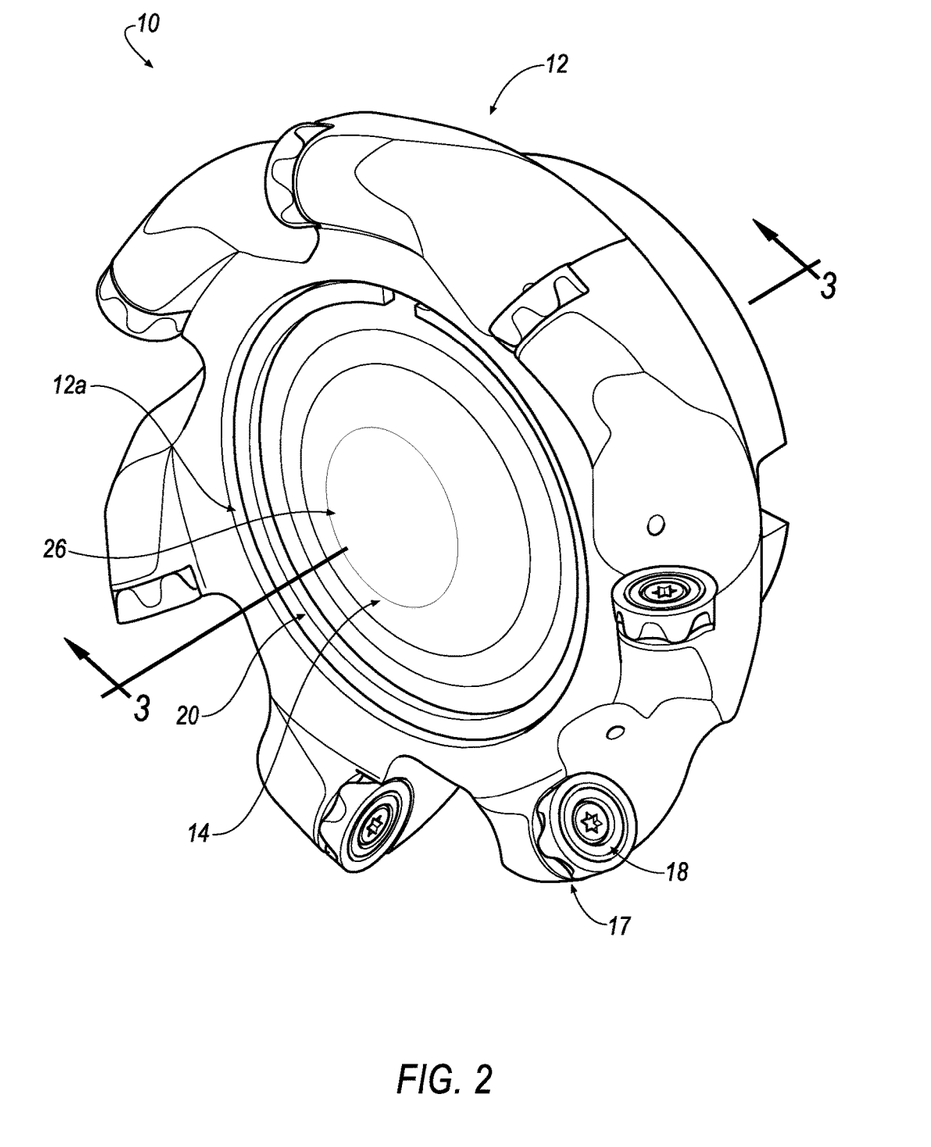
FIG. 2 is an isometric view of the cutting tool of FIG. 1 assembled with the coolant cap releasably secured to the cutter body by the retaining ring.

Typically, a retaining screw 15 is used to mount the cutter body 12 to a rotatable shaft, shaft adapter, or spindle of a milling machine (not shown). Optionally, the retaining screw 15 can be replaced with other means for mounting the cutter body 12 to the milling machine, such as threaded fasteners, and the like. The retaining screw 15 is arranged about an axis 16 of rotation of the milling cutter 10, which coincides with the axis of rotation of the milling machine to which the milling cutter 10 is mounted. The retaining screw 15 has a central opening 15a to allow coolant to pass therethrough. The cutter body 12 also has a plurality of insert-receiving pockets 17 successively defined on the outer peripheral surface of the cutter body 12. Each of the pockets 17 is of a prescribed dimension.

Cutting inserts 18, for example, made of high-speed steel, powder metal, carbides or ceramics, are held respectively within the pockets 17 successively without interruptions or gaps therebetween. As shown in the illustrated embodiment, a total of eight (8) cutting inserts 18 are mounted in the cutting body 12. However, it will be appreciated that the invention is not limited by the number of cutting inserts 18 that are mounted in the cutter body 12, and that the principles of the invention can be applied to a cutter body 12 in which any desirable number of cutting inserts 18 can be isometrically and/or tangentially mounted therein.

Figure 3:
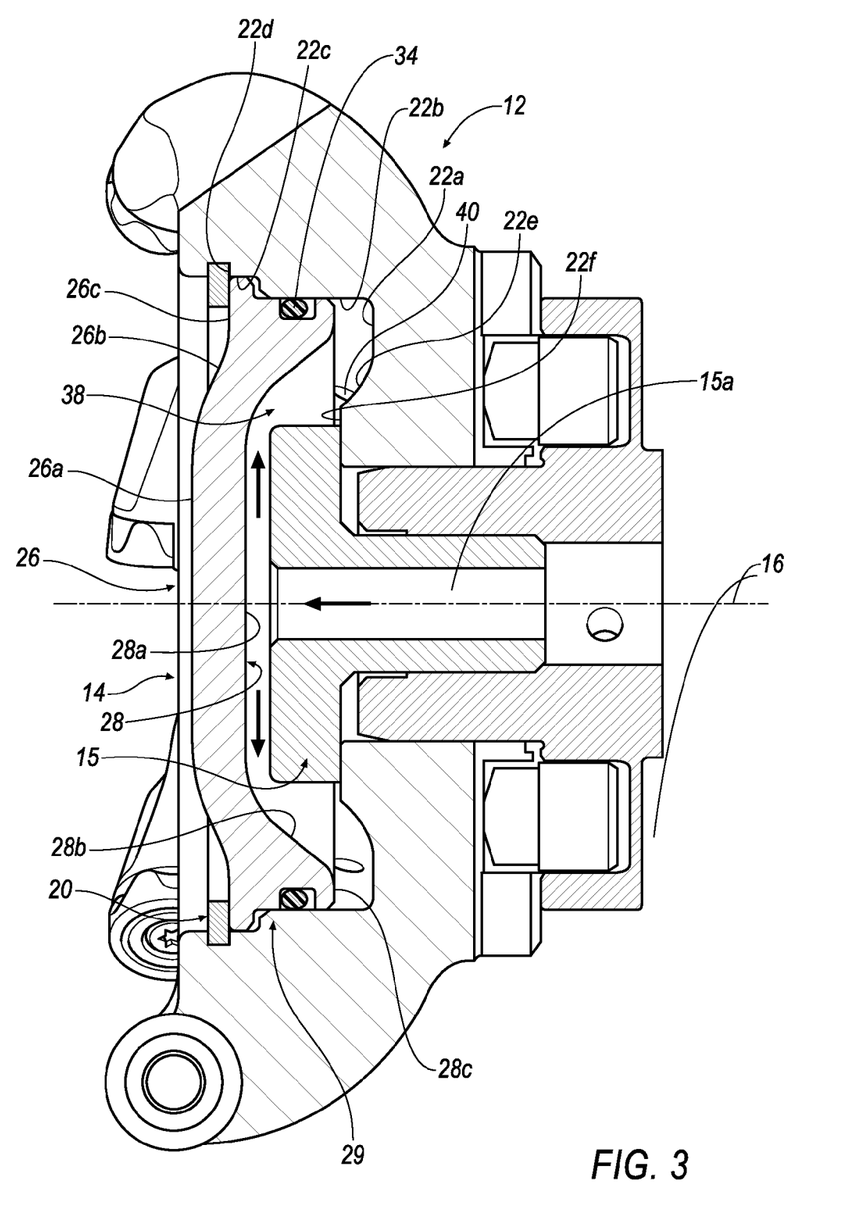
FIG. 3 is a cross-sectional view of the cutting tool assembled with the coolant cap taken along line 3-3 of FIG. 2.
Figure 4:
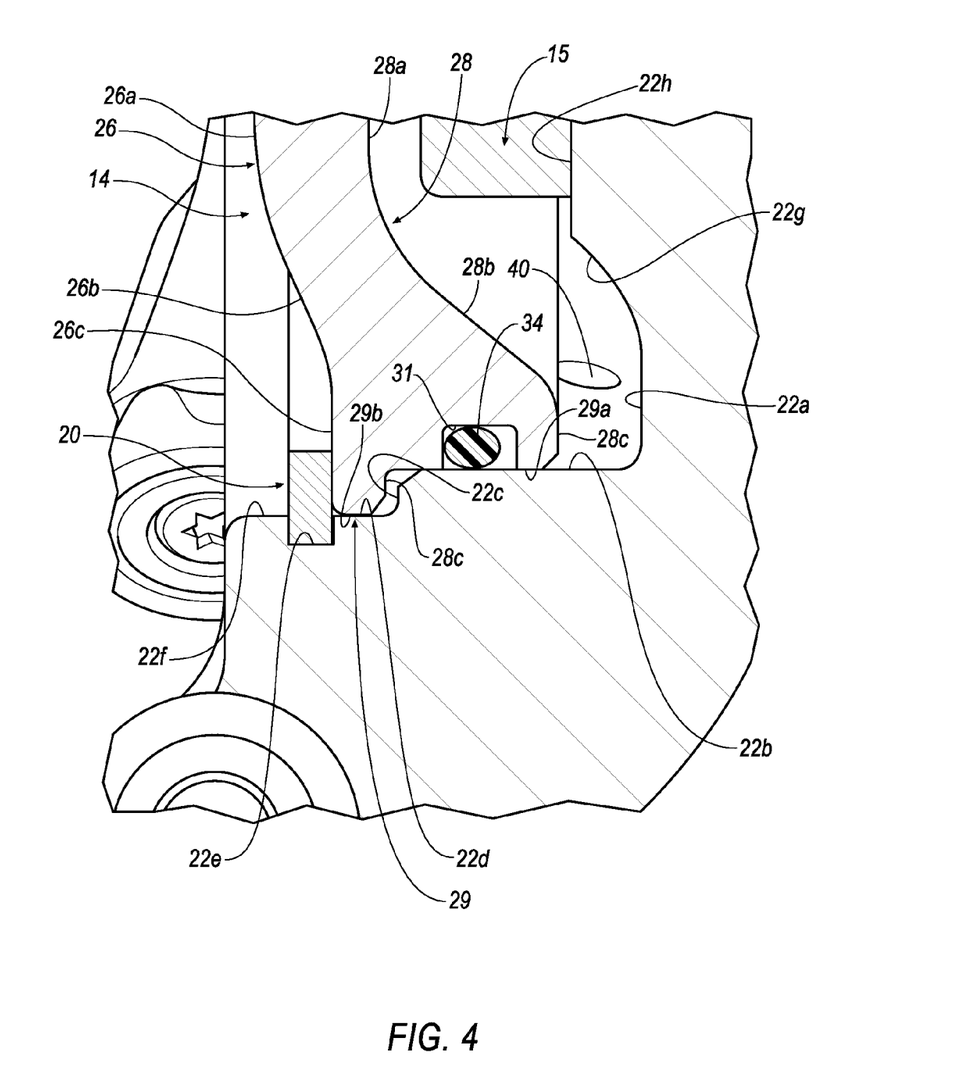
FIG. 4 is an enlarged, partial cross-sectional view of the coolant cap releasably secured to the cutter body by the retaining ring of FIG. 3 showing the coolant chamber between the coolant cap and the cutter body.
Figure 5:
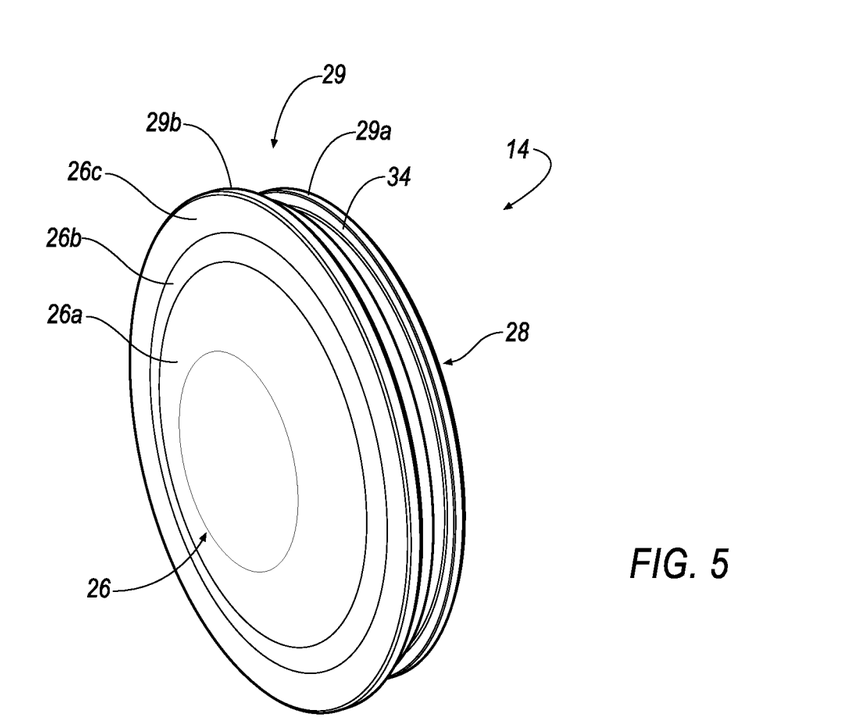
FIG. 5 is a front isometric view of the coolant cap according to an embodiment of the invention.
Figure 6:
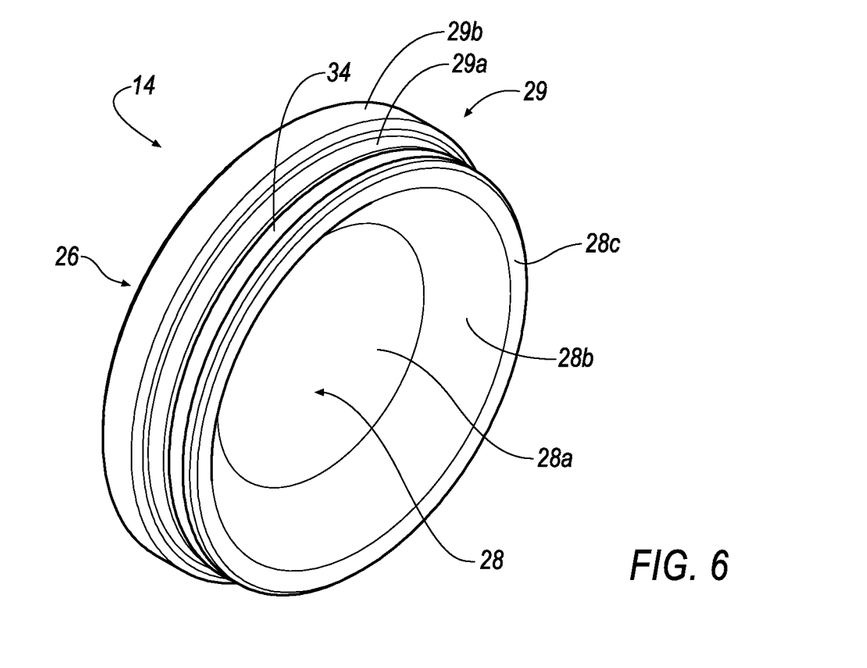
FIG. 6 is a rear isometric view of the coolant cap according to an embodiment of the invention.
Figure 7:
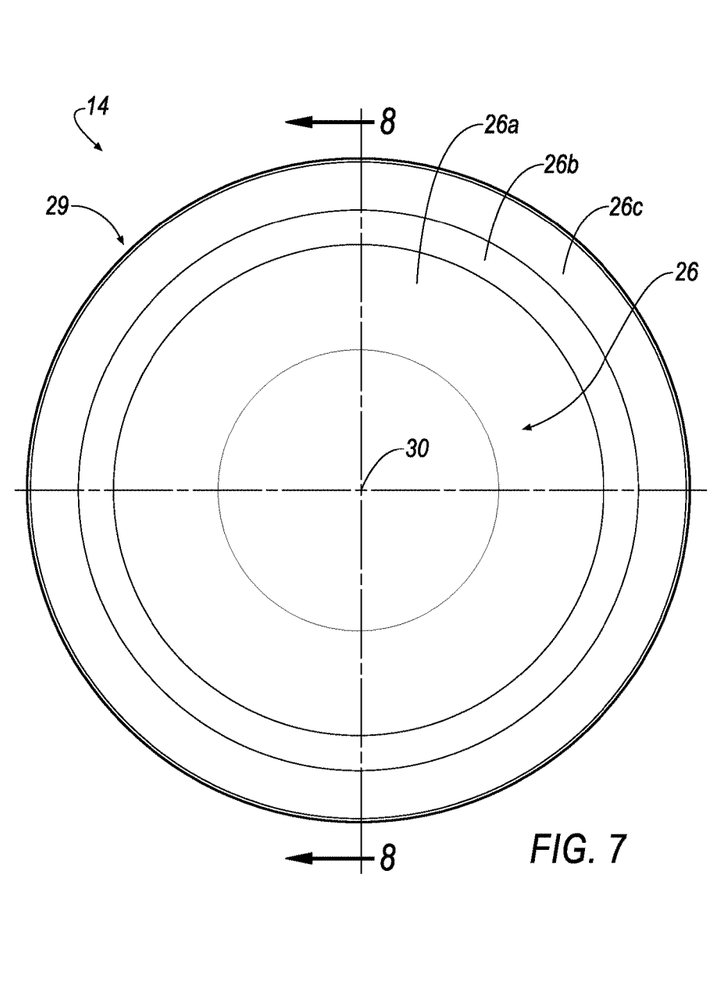
FIG. 7 is a top view of the coolant cap.

As shown in FIGS. 3 and 4, the cutter body 12 also includes a generally circular recessed surface 22 formed in a front face 12a of the cutter body 12. As shown in FIG. 3, the recessed surface 22 includes a bottom surface 22a, a first cylindrical surface 22b extending axially (in the direction of the rotational axis 16 or x-axis) from the bottom surface 22a toward the front face 12a, and a second cylindrical surface 22c radially outward (in the direction perpendicular to the rotational axis 16 or x-axis) with respect to the first cylindrical surface 22b to the front face 12a. The second cylindrical surface 22c includes a retaining ring notch 22d formed therein. In addition, the recessed surface 22 includes an arcuate inner surface 22e extending radially inward with respect to the bottom surface 22a and a retaining screw seating surface 22f extending radially inward with respect to the arcuate inner surface 22e.

In the illustrated embodiment, the bottom surface 22a, the first cylindrical surface 22b, the second cylindrical surface 22c, the retaining ring notch 22d, the arcuate inner surface 22e and the retaining screw seating surface 22f are concentrically disposed about the central axis 16.

Referring to FIGS. 5-8, the coolant cap 14 is generally circular-shaped and preferably made of a steel, so as to be able to withstand high-pressure coolant. As used herein, high-pressure coolant is coolant having a pressure between about 900 psi (62.0 bars) to about 3000 psi (206.8 bars). The coolant cap 14 has a generally planar outer surface 26, an inner surface 28, a cylindrical outer surface 29 extending between the outer surface 26 and the inner surface 28 and a central axis 30.

The outer surface 26 of the coolant cap 16 includes a substantially planar top outer surface 26a, an arcuate outer surface 26b extending radially outward with respect to the top outer surface 26a, and a substantially planar bottom outer surface 26c extending radially outward from the tapered outer surface 26b to the cylindrical outer surface 29. The top outer surface 26a, the arcuate outer surface 26b and the bottom outer surface 26c are concentrically disposed about the central axis 30 of the coolant cap 14.

The inner surface 28 of the coolant cap 14 includes a substantially planar bottom inner surface 28a and an arcuate inner surface 28b extending radially outward with respect to the bottom inner surface 28a and a planar top inner surface 28c extending radially outward from the arcuate inner surface 28b to the cylindrical outer surface 29. The bottom inner surface 28a, the arcuate inner surface 28b and the top inner surface 28c are concentrically disposed about the central axis 30 of the coolant cap 14. It is noted that the central axis 30 of the coolant cap 14 is substantially aligned and parallel with the central axis 16 of the cutter body 12 when the coolant cap 14 is mounted to the cutter body 12.

Figure 8:
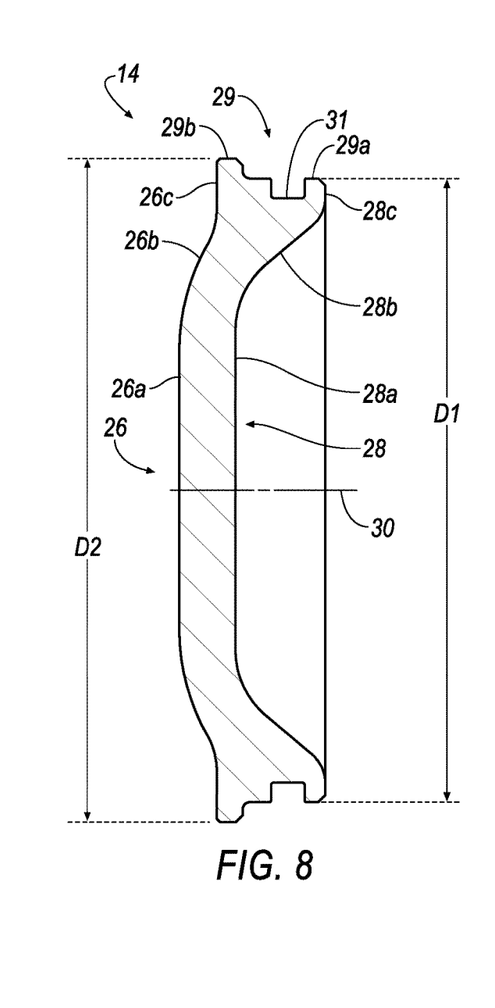
FIG. 8 is a cross-sectional view of the coolant cap taken along line 8-8 of FIG. 7.

As shown in FIG. 8, the cylindrical outer surface 29 of the coolant cap 14 includes a first cylindrical outer surface portion 29a extending axially (in the direction of the central axis 30 or x-axis) from the inner surface 28. The first cylindrical outer surface portion 29a has an outer diameter, D1, and a notch 31 formed therein. The notch 31 is configured to accommodate a sealing member 34, such as an O-ring, and the like (FIGS. 3 and 4). The purpose of the sealing member 34 is to prevent high-pressure coolant from leaking between the cutter body 12 and the coolant cap 14. The cylindrical outer surface 29 also includes a second cylindrical outer surface portion 29b. The second cylindrical outer surface portion 29b has an outer diameter, D2, which is larger than the outer diameter, D1, of the first cylindrical outer surface portion 29a. It should be noted that the outer diameter, D1, of the first cylindrical outer surface portion 29a, and the outer diameter, D2, of the second cylindrical outer surface portion 29b are slightly smaller than the outer diameter of the first cylindrical surface 22b and the second cylindrical surface 22c of the recessed surface 22 of the cutter body 12, respectively, so that the coolant cap 14 makes a snug fit when disposed within the cutter body 12, as shown in FIGS. 3 and 4.

Referring back to FIG. 3, the coolant cap 14 is releasably secured to the cutter body 12 such that the bottom inner surface 28a of the coolant cap 14 is positioned in a spaced relationship with respect to the retaining screw 15. Similarly, the arcuate inner surface 28b of the coolant cap 14 is positioned in a spaced relationship with respect to the arcuate inner surface 22e of the recessed surface 22 of the cutter body 12. In addition, the top inner surface 28c of the coolant cap 14 is positioned in a spaced relationship with respect to the bottom surface 22a of the recessed surface of the cutter body 12. This spaced relationship between the cutter body 12, the retaining screw 15 and the coolant cap 14 forms a coolant chamber 38 through which high-pressure coolant, such as fluid, and the like, is directed from the spindle of a milling machine (not shown) to the vicinity of the cutting inserts 18. Specifically, the high-pressure coolant is directed through the central opening 15a of the retaining screw 15 and flows in the direction of the arrows through the coolant chamber 38 and into a plurality of coolant openings 40 formed in the cutter body 12 (only one coolant opening 40 is shown in FIG. 3 for brevity). The coolant openings 40 direct the high-pressure coolant radially outward in an efficient manner from the coolant chamber 38 to a vicinity of the cutter insert 18.

When high-pressure coolant is introduced into the cutter body 12, the outer surface 26 of the coolant cap 14 is urged toward the front face 12a of the cutting body 12 such that the outer surface 26, and in particular the bottom outer surface 26c of the coolant cap 14 contacts the retaining ring 20 to removably secure the coolant cap 14 to the cutter body 12. Simulation using Finite Element Analysis (FEA) have indicated that the coolant cap 14 of the invention is capable of directing high-pressure coolant (i.e., coolant having a pressure between about 900 psi (62.0 bars) to about 3000 psi (206.8 bars)) without leakage due to failure of the coolant cap 14. As a result, the coolant cap 14 of the invention is capable of superior delivery of high-pressure coolant to the vicinity of the cutting inserts 18 as compared to conventional coolant caps.

The patents and publications referred to herein are hereby incorporated by reference.

Having described presently preferred embodiments the invention may be otherwise embodied within the scope of the appended claims.

What is claimed is:
1. A rotary cutting tool, comprising:
a cutter body having a recessed surface formed in a front face of the cutter body, the recessed surface including a retaining ring notch formed therein;
a retaining screw which mounts the cutter body to a rotatable component;
the retaining screw including at least one passage which directs high pressure coolant toward the front face of the cutter body;
a coolant cap disposed within the recessed surface of the cutter body, the coolant cap including an outer surface, an inner surface and a cylindrical outer surface extending between the outer surface and the inner surface; and
a retaining ring disposed within the retaining ring notch of the cutter body, to removably secure the coolant cap to the cutter body;
wherein the outer surface of the coolant cap contacts the retaining ring when high pressure coolant is introduced into the cutter body;
a coolant chamber in communication with the at least one passage of the retaining screw, wherein the coolant chamber is formed by the retaining screw, the cutter body and the inner surface of the coolant cap;

wherein the inner surface of the coolant cap is positioned in a spaced-apart relationship with respect to the retaining screw and the cutter body, and the inner surface of the coolant cap includes a planar bottom inner surface which faces the retaining screw;

wherein the inner surface of coolant cap further includes:

an arcuate inner surface extending radially outwardly and axially away with respect to the planar bottom inner surface; and a planar top inner surface extending radially outwardly from the arcuate inner surface to the cylindrical outer surface whereby high-pressure coolant enters the coolant chamber and is directed: onto the planar bottom inner surface of the coolant cap, radially and axially away from the planar bottom inner surface, and radially outwardly to a vicinity of cutting inserts mounted on the cutter body.

2. The rotary cutting tool of claim 1, wherein the outer surface of the coolant cap includes a planar top outer surface, an arcuate outer surface extending radially outwardly with respect to the top outer surface and a planar bottom outer surface extending radially outwardly from the arcuate outer surface to the cylindrical outer surface.

3. The rotary cutting tool of claim 2, wherein the retaining ring contacts the planar bottom outer surface when high pressure coolant is introduced into the cutter body.

4. The rotary cutting tool of claim 1, wherein the recessed surface includes a bottom surface, a first cylindrical surface extending axially from the bottom surface toward a front face of the cutter body, and a second cylindrical surface radially outwardly from the first cylindrical surface toward the front face.

5. The rotary cutting tool of claim 4, wherein the recessed surface further includes an arcuate inner surface extending radially inwardly with respect to the bottom surface and a retaining screw seating surface extending radially inwardly with respect to the arcuate inner surface.

6. The rotary cutting tool of claim 1, wherein the at least one passage comprises a central opening disposed in the retaining screw.

7. The rotary cutting tool of claim 1, wherein said cutter body comprises coolant openings which are in communication with the coolant chamber and which direct high-pressure coolant to a vicinity of cutting inserts.

8. The rotary cutting tool of claim 1, wherein:

the cylindrical outer surface of the coolant cap has a notch formed therein;

wherein the notch accommodates a sealing member which prevents high-pressure coolant from leaking between the cutter body and the coolant cap.

9. The rotary cutting tool of claim 1, wherein the cylindrical outer surface of the coolant cap includes:

a first cylindrical outer surface portion extending axially from the inner surface and having a notch formed therein; and a second cylindrical outer surface portion extending axially between the first cylindrical outer surface and the outer surface;

wherein an outer diameter of the second cylindrical outer surface portion is greater than an outer diameter of the first cylindrical surface portion.

10. The rotary cutting tool of claim 9, wherein:

the first cylindrical outer surface portion has a notch formed therein;

wherein the notch accommodates a sealing member which prevents high-pressure coolant from leaking between the cutter body and the coolant cap.

11. The rotary cutting tool of claim 1, wherein the recessed surface includes:

a bottom surface;

an arcuate inner surface extending radially inwardly with respect to the bottom surface of the recessed surface; and a retaining screw seating surface extending radially inwardly with respect to the arcuate inner surface of the recessed surface.

12. The rotary cutting tool of claim 11, wherein:

the bottom surface of the inner surface of the coolant cap is positioned in a spaced relationship with respect to the retaining screw;

the arcuate inner surface of the coolant cap is positioned in a spaced relationship with respect to the arcuate inner surface of the recessed surface; and the top inner surface of the coolant cap is positioned in a spaced relationship with respect to the bottom surface of the recessed surface.

13. A coolant cap for a rotary cutting tool, comprising:

an outer surface;

an inner surface; and a cylindrical outer surface extending between the outer surface and the inner surface, wherein the outer surface of the coolant cap contacts a retaining ring when high pressure coolant is introduced into a cutter body to removably secure the coolant cap to the cutter body;

wherein the inner surface of the coolant cap includes:

a planar bottom inner surface;

an arcuate inner surface extending radially outwardly and axially away with respect to the planar bottom inner surface; and a planar top inner surface extending radially outwardly from the arcuate inner surface to the cylindrical outer surface.

14. The rotary cutting tool of claim 13, wherein the outer surface of the coolant cap includes a planar top outer surface, an arcuate outer surface extending radially outwardly with respect to the top outer surface and a planar bottom outer surface extending radially outwardly from the arcuate outer surface to the cylindrical outer surface.

15. The rotary cutting tool of claim 14, wherein the retaining ring contacts the planar bottom outer surface when high pressure coolant is introduced into the cutter body.

16. The coolant cap of claim 13, wherein:

the cylindrical outer surface has a notch formed therein;

wherein the notch accommodates a sealing member which prevents high-pressure coolant from leaking between a cutter body and the coolant cap.

17. The coolant cap of claim 13, wherein the cylindrical outer surface includes:

a first cylindrical outer surface portion extending axially from the inner surface and having a notch formed therein; and a second cylindrical outer surface portion extending axially between the first cylindrical outer surface and the outer surface;

wherein an outer diameter of the second cylindrical outer surface portion is greater than an outer diameter of the first cylindrical surface portion.

18. The coolant cap of claim 17, wherein:

the first cylindrical outer surface portion has a notch formed therein;

wherein the notch accommodates a sealing member which prevents high-pressure coolant from leaking between a cutter body and the coolant cap.

* * * * *